United States Patent [19]
Eckman

[11] Patent Number: 5,163,483
[45] Date of Patent: Nov. 17, 1992

[54] APPARATUS FOR ACCESSING PRESSURIZED MEMBERS

[75] Inventor: Charles K. Eckman, Freeport, Ill.

[73] Assignee: Emergency Technical Services Corporation of Illinois, Schaumburg, Ill.

[21] Appl. No.: 725,654

[22] Filed: Jul. 3, 1991

[51] Int. Cl.⁵ ............................................... B65B 1/04
[52] U.S. Cl. .......................................... 141/1; 141/51; 222/81
[58] Field of Search .................. 141/1, 51, 65, 329, 141/330; 222/81, 83, 83.5, 86, 87, 82, 89, 80

[56] References Cited

U.S. PATENT DOCUMENTS

| | | | |
|---|---|---|---|
| 2,051,981 | 8/1936 | Bowman | 222/89 |
| 3,333,735 | 8/1967 | Odasso | 222/82 |
| 4,458,734 | 7/1984 | Scholle et al. | 141/51 |
| 4,513,788 | 4/1985 | Coker et al. | 138/89 |
| 4,690,180 | 9/1987 | Gold | 141/51 |
| 4,927,182 | 5/1990 | Moore | 285/15 |
| 4,944,333 | 7/1990 | Gold et al. | 141/51 |
| 5,086,814 | 2/1992 | Sato et al. | 141/51 |

OTHER PUBLICATIONS

Brochure of Sigri Corporation, "Impact Screwing Mechanism S 83 For Recovery Container/Transport Vessel Type TG 168", Oct. 11, 1983.
Brochure of ERC, "Services", (undated).

Primary Examiner—Charles E. Phillips
Assistant Examiner—David J. Walczak
Attorney, Agent, or Firm—Welsh & Katz, Ltd.

[57] ABSTRACT

Containerless apparatus for accessing a pressurized member and identifying fluid contents thereof includes a support for an access port to be provided to the interior of the member, a cutting device removably secured to the support for cutting a substantially flat sealing portion in the exterior of the member, a seal forming coupling secured to the support for forming a seal with substantially flat sealing portion, and a drilling mechanism including a drilling tool for drilling an access port in the sealing portion of the member through the coupling. A valve may be included between the drilling mechanism and the coupling to control the passage of fluid, with the drilling tool passing through the valve when such valve is in the open position. A sampling mechanism may be secured in fluid-tight relation to the drilling mechanism for sampling the fluid contents of the member. A method is described for providing access to fluid in the member, with the fluid being retained in the apparatus during and following the cutting of the access port in the member.

12 Claims, 5 Drawing Sheets

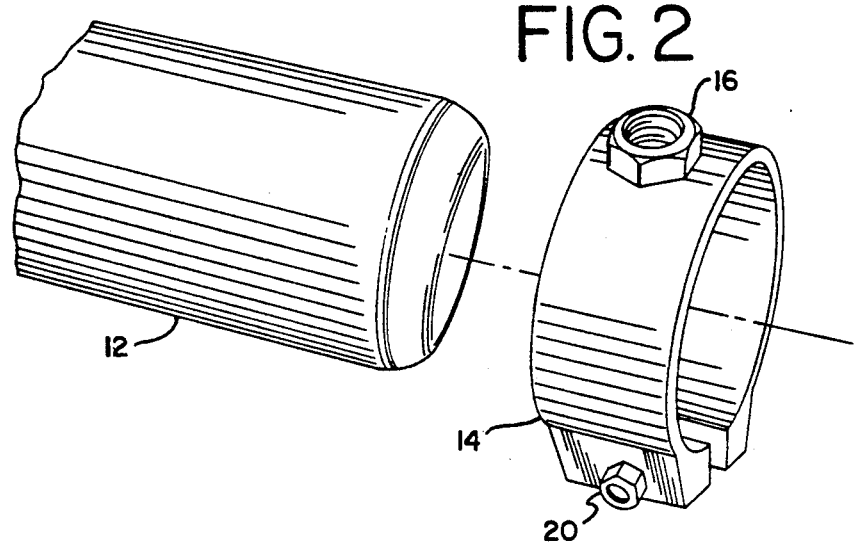
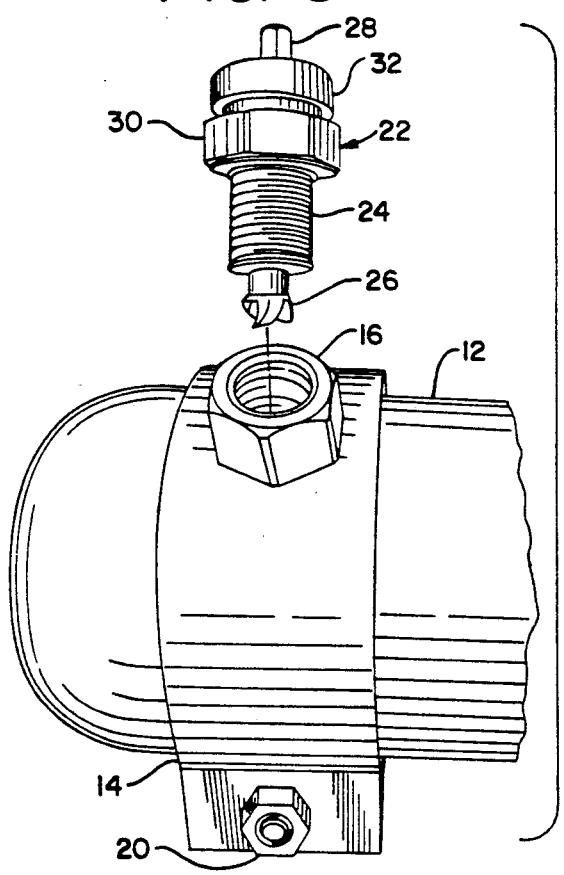
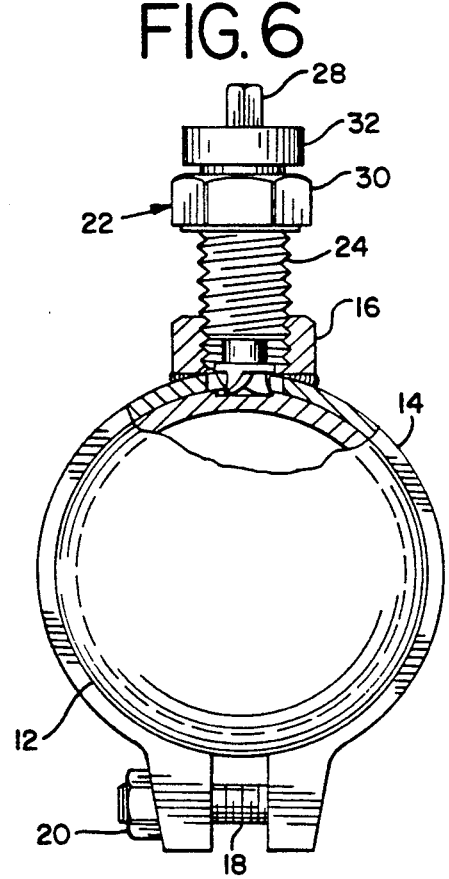

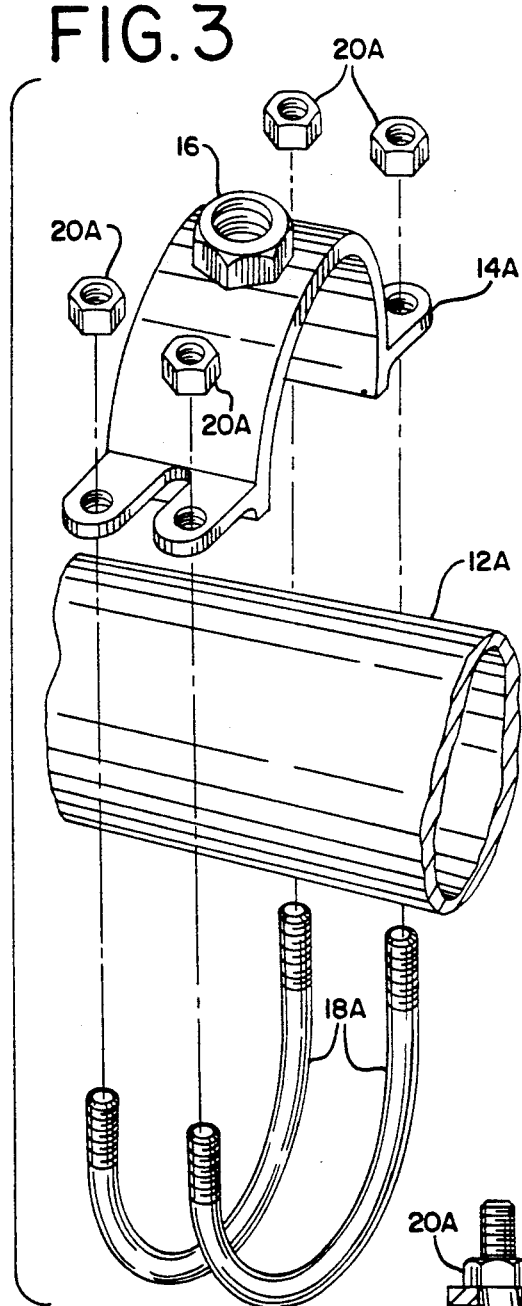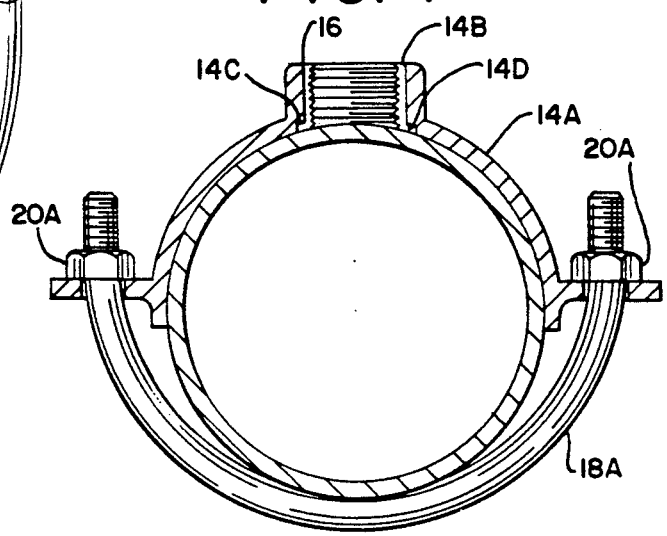

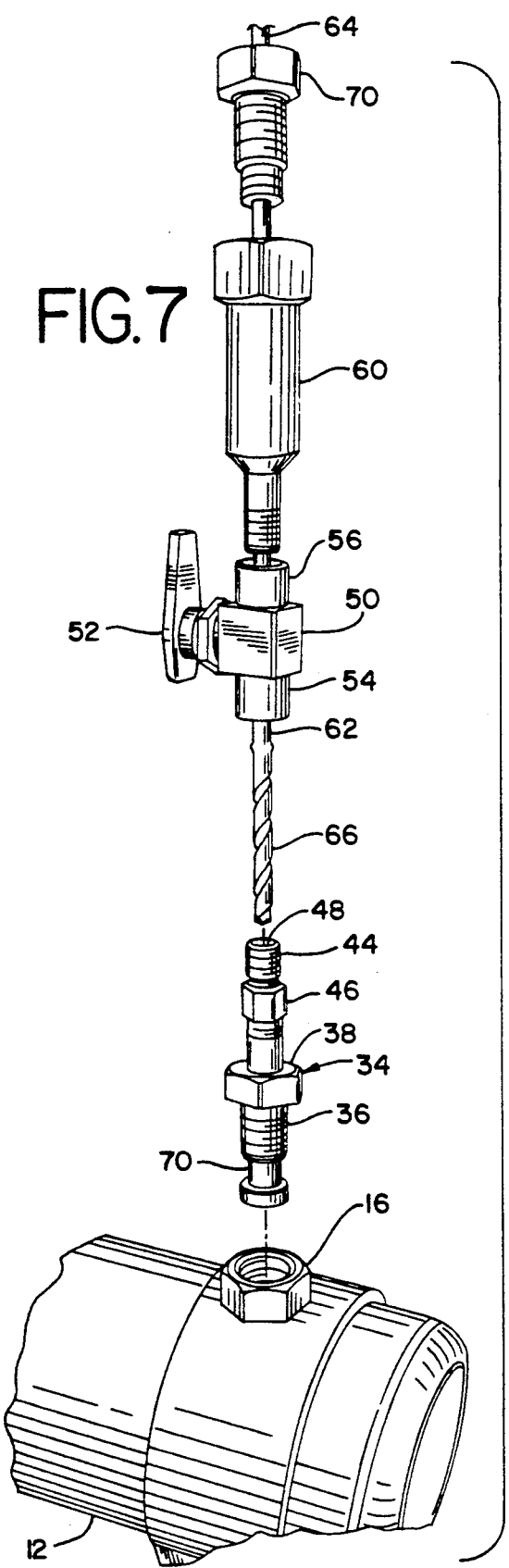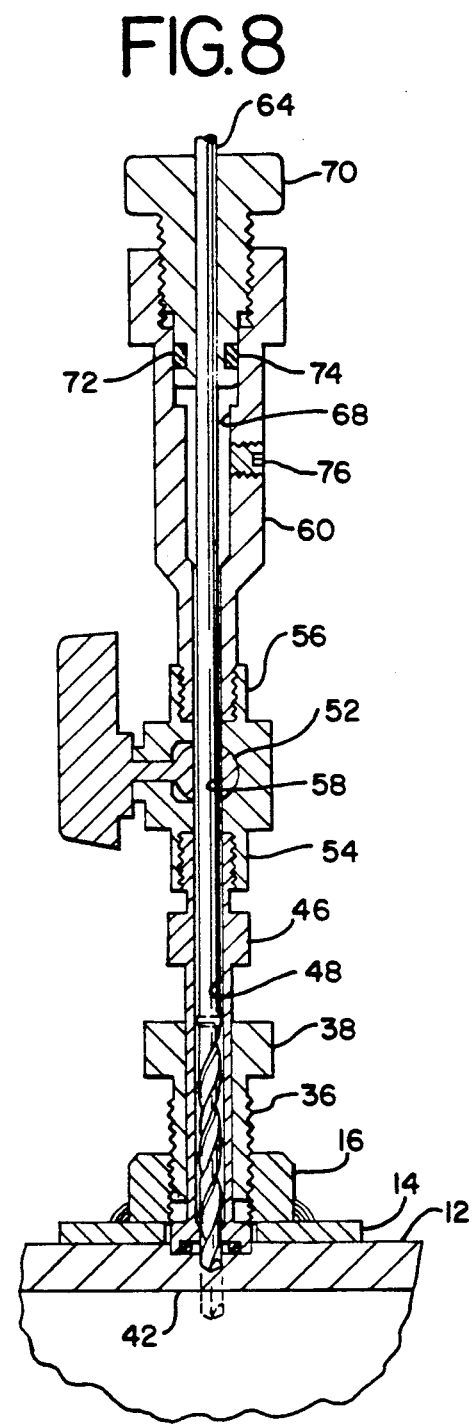

APPARATUS FOR ACCESSING PRESSURIZED MEMBERS

BACKGROUND OF THE INVENTION

1. Field of the Invention

This invention relates to the field of hazardous waste management, and more particularly to accessing pressurized members, such as compressed gas cylinders, or pipes or pipelines containing fluids under pressure, particularly compressed gases. The invention is particularly useful in preparation for identifying the contents of compressed gas cylinders and/or for their disposal. Pressurized members of unknown contents, including hazardous gases, such as compressed gas cylinders, are frequently found in storage areas, at hazardous waste sites, and at other locations. Often these containers are in corroded condition, with the labelling missing or deteriorated so that the contents cannot be determined from the labelling, and often the valves furnished with the containers have corroded or have deteriorated so as to be unusable. The present concern with safe disposal of hazardous wastes, and particularly toxic materials, has created a need for methods and apparatus to enable the safe sampling and identification of such materials, particularly to identify the contents of pressurized containers whose valves are inoperable, to aid in their disposal. The invention is also particularly useful in providing a safe means to sample fluids in pipes and pipelines under pressure without shutting down and purging the pipe or pipeline section.

2. Description of the Prior Art

Pressurized containers, most frequently compressed gas cylinders, whose contents are unknown and cannot be sampled because the valve of the member is inoperable, presents a problem to the safe transportation of the containers and disposal of their contents. Prior to the present invention, one method of disposal was to detonate the container, which is a highly dangerous procedure often causing the uncontrolled release of the unknown contents into the atmosphere. Another method which permits sampling of the contents prior to disposal is to place the container into a larger, pressure vessel, and puncturing the container or forcing its valve to open to release the contents into the pressure vessel. The said latter procedure is illustrated by U.S. Pat. Nos. 4,690,180 and 4,944,333. The use of a pressure vessel for containment of the container and its unknown contents, requires that a suitable vessel be available, often at the site, as containers of unknown contents usually cannot be transported. In addition, due to the size of such pressure vessels, equipment such as lifts or cranes are required to manipulate the pressure vessel. Furthermore, such pressure vessels are often costly, and are not readily available in the quantities required for the efficient sampling of a number of pressurized containers, such as is found in an industrial waste disposal site.

The present invention is advantageous over the procedures and apparatus of the prior art, in that access and sampling of the contents of pressurized members are accomplished without the use of pressure vessels into which the contents are to be released. Another advantage of the present invention is that portions of the apparatus can remain on the member for further use in assisting in the disposal of its contents.

SUMMARY OF THE INVENTION

An object of the present invention is to provide a safe, easily transportable apparatus for accessing the contents of pressurized members.

Another object of the invention is to provide containerless apparatus for accessing and sampling the contents of a pressurized member which is easily handled.

Still another object of this invention is to provide a method for accessing and sampling the fluid contents of a pressurized member, which does not require a separate container for the pressurized member or contents.

These and other objects of the present invention will be readily apparent from the following summary and detailed description.

The present invention provides an apparatus for accessing the fluid contents of pressurized members, such as compressed gas cylinders, pipes and pipelines, which is particularly useful where the valve furnished with the member is inoperable due to deterioration from corrosion and the like. The apparatus is containerless, in that a container other than the member containing the fluid of unknown content is not required.

In accordance with the present invention, a portion of the member is selected to which the apparatus of the invention is to be secured. The selected portion of the member is preferably a portion of a wall of the member which has a substantially uniform thickness. When the member is a compressed gas cylinder, this selected portion is usually a portion of the side or wall surface of the cylinder, at least several inches above its bottom or end cap structure. The selected portion is cleaned to remove any rust, scale, excess paint, or other deteriorated or removable surface material. A portion of substantially uniform thickness can be determined by gauging the wall of the member, for example by use of an ultrasonic gauge at selected spaced points on a portion of the wall.

The apparatus of the present invention includes a connecting mechanism for providing support for a cutting device and an access port to be formed in the member. The connecting mechanism can be a collar, such as a split collar, or a tapped saddle which may be clamped to the member by a securing mechanism, such as a bolt passing through the ends of the collar and a nut receiving the bolt at one of the ends of the collar, or by a U-bolt and a pair of nuts to secure the tapped saddle to the member. The connecting mechanism has a support, such as a threaded nipple or nut integral with or welded to the collar or saddle, for supporting other portions of the present apparatus which form the port to the interior of the member.

In the present invention, a flat sealing portion is provided on the selected portion of the member. The sealing portion can be provided by removably securing a cutting device to the connecting mechanism at the selected portion. A cutting device, in accordance with this invention, can be a bushing or housing in which an end-mill bit is journalled and which can be threaded into the nipple or nut of the connecting mechanism, and the shank of the bit can be rotated to form the substantially flat sealing portion. Following forming of the sealing portion, the cutting device is removed by unthreading from the connecting mechanism. It is recognized that the selected portion of the member will no longer be of substantially uniform thickness after the sealing portion has been formed, but this is not disadvantageous, and will aid in forming the access port. The cutting device must not penetrate the wall of the member which would result in accidental, uncontrolled release of the contents.

A coupling device for forming a fluid-tight seal with the flat sealing portion formed in the wall of the member is secured to the connecting mechanism. The coupling device in accordance with the invention has sealing means, such as a gasket or 0-ring or washer or flat metal seal of fluid resistant material, at its lower end to form the fluid-tight seal with the flat sealing portion of the member. The coupling device has a bore to allow the passage of fluid therethrough.

A drilling mechanism for forming an access port to the member is secured to the coupling device in fluid-tight relation. The drilling mechanism can include a housing and a drilling tool having a shank and a drilling bit for cutting an access port in the wall of the member. The housing includes a bore through which the drilling tool is adapted to be reciprocally moved and rotated and through which fluids may pass, and the housing may have at least one port providing access to the bore. The housing also has a seal at one end with the shank passing therethrough in fluid-tight relation.

In a preferred embodiment of the invention, the apparatus includes a valve mechanism securable in fluid-tight relation between the coupling device and the drilling mechanism for controlling the passage of fluids therebetween. The valve mechanism has an open, fluid passage position and a closed fluid blocking position, and has a bore therethrough such that when the valve mechanism is in the open, fluid passage position the drilling tool may move reciprocally and rotatably therethrough and fluid from the member may also pass therethrough.

The apparatus optionally can include a sampling mechanism for determining the identity of fluid from the member. The sampling mechanism can be connected in fluid passage relationship to the drilling mechanism, for example through the port providing access to the bore therein. The sampling mechanism can include an analytical device, such as a chromatographic column, which upon receiving a sample of the fluid from the member, will provide to the operator an identification of the fluid in the member or permit the operator to identify the fluid. The sampling mechanism can also include a manifold to which multiple analytical devices can be connected for analysis of the fluid from the member.

The method of the present invention comprises securing a connecting mechanism to a portion of the member which has been cleaned of rust, scale, excess paint or other removable material for providing support for access to the interior of the member, with the support defined by the connecting mechanism positioned in abutment to the member. The selected portion of the member is preferably a portion of a wall thereof which has a substantially uniform thickness, and which may be located by determining the thickness of a number of spaced-apart points, for example, by use of an ultrasonic gauge.

The method further includes removably securing a cutting device to the connecting mechanism for cutting a substantially flat sealing portion in the exterior of the member, preferably at the selected portion. A suitable cutting device is described above.

Following securing of the connecting mechanism, cutting of the substantially flat sealing portion, removal of the cutting device, and removal of any cutting debris, for example, by using a blast of compressed air, a coupling device is secured to the connecting mechanism in fluid-tight relation to the member. As noted above, the coupling device is adapted to form a seal with the flat sealing portion provided on the member and has a bore to allow fluid from the member to pass therethrough. The method of the present invention further includes securing a drilling mechanism to the coupling device in fluid-tight relation. As noted above, the drilling mechanism includes a housing and a drilling tool having a shank and a drilling bit for cutting an access port in the wall of the member through the flat sealing portion. The housing includes a bore through which the drilling tool is adapted to be reciprocally moved and rotated and through which fluids may pass, and has at least one port providing access to the bore. The housing also has a seal at one end with the shank passing therethrough in fluid-tight relation. The bore of the coupling device also is adapted to receive the bit of the drilling tool to drill the access port in the member.

The method preferably further comprises securing a valve mechanism in fluid-tight relation to the coupling device, and securing the drilling mechanism in fluid-tight relation to the valve mechanism for controlling the passage of fluids therebetween. The valve mechanism has an open, fluid passage position and a closed fluid blocking position, and has a bore therethrough such that when the valve mechanism is in the open position, the drilling tool may move reciprocally and rotatably therethrough and fluid from the member may be drawn to the optional sampling mechanism for determination of its identity.

The method optionally further comprises securing a sampling mechanism for determining the identity of fluid from the member to a port in the drilling mechanism providing access to its bore.

The method also includes drilling an access port in the member through the selected portion of the member within the area of the seal formed by the coupling device with the member, by rotating and advancing the shank of the drilling tool into the housing of the drilling mechanism to advance the bit of the drilling tool through the bore of the housing of the drilling mechanism and the bore of the coupling device and into the member, followed by withdrawing the drilling tool from the interior of the member and the bore of the coupling device. Fluid passing from the member into the bores of the apparatus is retained therein as each of the means is secured to the adjacent in fluid-tight relation. Additionally, an inert gas such as helium, can be supplied into the apparatus, for example, through a bore in the drilling mechanism or the manifold of the optional sampling mechanism during the drilling step and the withdrawing step to reduce the amount of fluid from the member entering the apparatus. Further, following withdrawal of the drilling tool from the coupling device and valve mechanism, if present, into the housing, the valve mechanism can be placed in the closed position, preventing fluid from the member from passing beyond the valve mechanism.

To sample and identify the fluid in the member, fluid is withdrawn from the member through the bores of the coupling device, the valve mechanism, if present, and the drilling mechanism. If the optional sampling mechanism is installed, the fluid can be conducted thereto, and the identity of the fluid withdrawn from the member can be determined by sampling the fluid in the sampling mechanism and analyzing the same as described above. Following identification of the fluid, the sampling mechanism and drilling mechanism can be removed from the apparatus, preferably following purging of these means with an inert gas, such as helium. After removal of these means, the member, if a container, can be transported with the coupling device and the valve mechanism in place, or its contents can be disposed of, through the use of these means.

BRIEF DESCRIPTION OF THE DRAWINGS

FIG. 2 is a perspective, exploded view of a connecting mechanism of the present invention applied to a pressurized container.

FIG. 3 is a perspective, exploded view of a connecting mechanism of the present invention applied to a pipe under pressure.

FIG. 4 is a cross-sectional end view of the connecting mechanism shown in FIG. 3.

FIG. 5 is a plan, exploded view of a cutting device and a connecting mechanism applied to a pressurized container.

FIG. 6 is a end, partially cross-sectional view of a cutting device and a connecting mechanism applied to a pressurized container.

FIG. 7 is a perspective, exploded view of a connecting mechanism, coupling device, valve mechanism and drilling mechanism of the present invention applied to a pressurized container.

FIG. 8 is a front, cross-sectional view of the assembled apparatus shown in FIG. 7.

DETAILED DESCRIPTION

Figure 1:
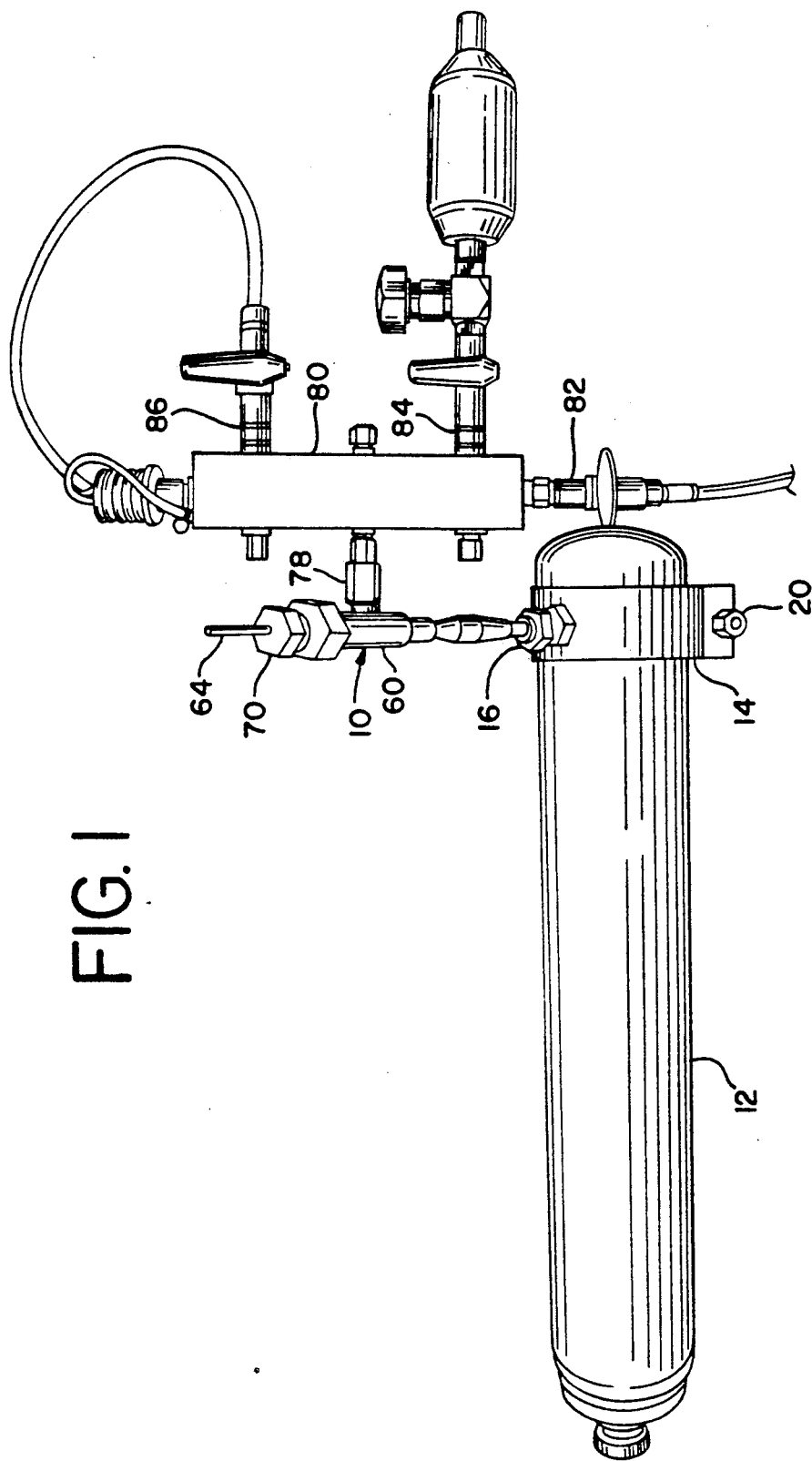
FIG. 1 is a plan view of the apparatus of the present invention for identifying fluid contents of a member applied to a pressurized member.
Figure 9:
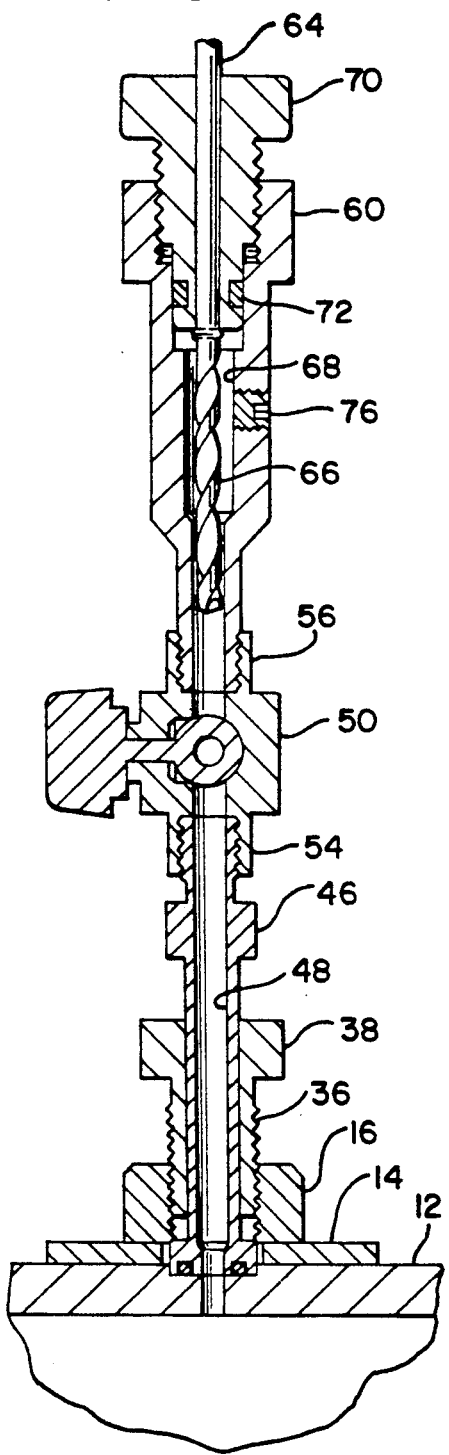
FIG. 9 is a front, cross-sectional view of the assembled apparatus shown in FIG. 7, with the valve mechanism in the closed position.
Figure 10:
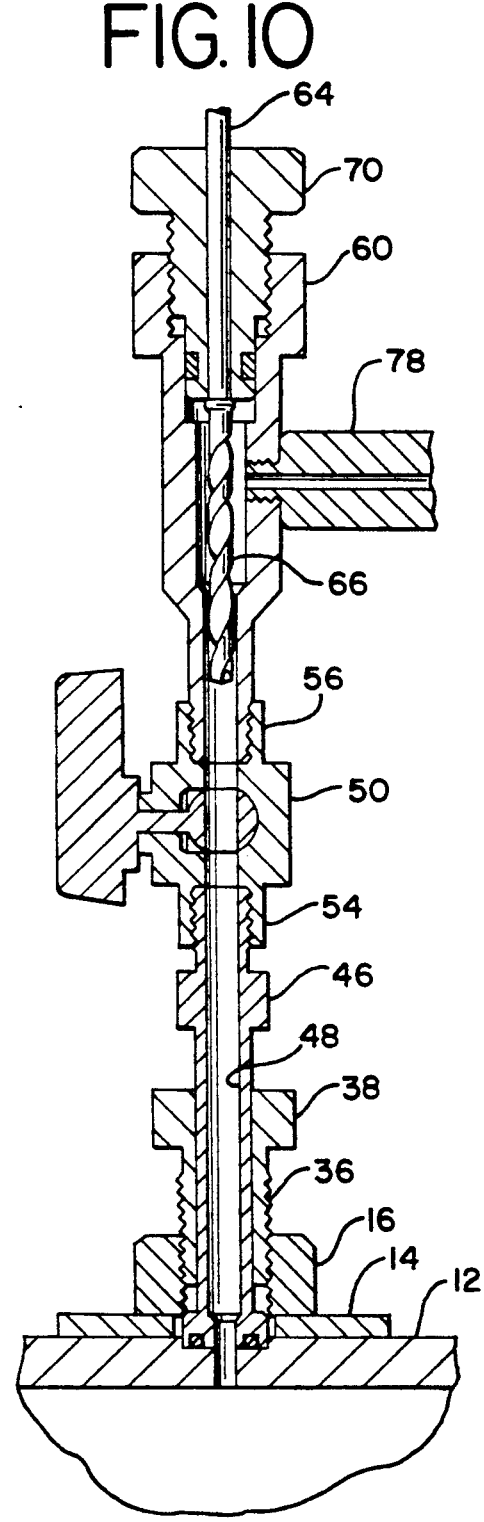
FIG. 10 is a front, cross-sectional view of the assembled apparatus shown in FIG. 7, with the valve mechanism in the open position, and with a conduit connected to a port in the drilling mechanism.

Referring now to the drawings, and in particular to FIG. 1, an apparatus 10 is shown in accordance with the present invention for providing access to the fluid contents of a member, in the embodiment shown a container 12, containing a fluid of unknown identity. Container 12 is usually a compressed gas cylinder of standard size, for example, either a small pressurized cylinder, known as a lecture bottle and used in laboratories and classrooms, or a larger, industrial compressed gas cylinder. It is preferred to clean the outside of the container, particularly the portion of the wall of container 12 where apparatus 10 is to be installed. Cleaning can be performed by methods known to the art, for example by brushing with a wire brush. It is also preferred to select a portion of a wall of container 12 which has a substantially uniform thickness. The portion can be selected by measuring the thickness of a number of closely spaced points along the surface of the container, for example by ultrasonic gauging.

As also shown in FIG. 2, apparatus 10 includes a connecting mechanism, in the form of a split collar 14 having a nut or internally threaded nipple 16 affixed to collar 14. Collar 14 is sized to be applied to the outside of container 12, and is secured tightly thereto by means for securing, such as a bolt 18 (FIG. 6) passing through the ends of collar 14 and a nut 20 threaded onto the end of bolt 18. If a portion of a wall of the container of substantially uniform thickness has been selected, it is preferred to position nut 16 over that portion.

While collar 14 is desirably used with a container, where the invention is to be utilized with a pipe or pipeline, it is preferable to use a connecting mechanism which can be assembled about the pipe or pipeline. For example, as shown in FIGS. 3 and 4, apparatus 10 may include a saddle 14A, having threaded insert 14B, and a pair of U-bolts 18A and nuts 20A threaded onto bolts 18A to firmly secure saddle 14A to the pipe or pipeline, represented by reference numeral 12A. Insert 14B is held within a bore formed in saddle 14A by means of a shoulder 14C of the insert and a corresponding recess 14D in the enlarged portion formed at the top of saddle 14A. Such enlarged portion can be formed by a nut welded to saddle 14A in the same manner as nipple 16 was affixed to collar 14. For convenience, henceforth, the connecting mechanism comprising saddle 14A, U-bolts 18A and nuts 20A, will be considered the same as the connecting mechanism formed of collar 14, and referred to by the same reference numerals, that is, as collar 14, etc.

In the preferred embodiment shown in the drawings, particularly FIGS. 5 and 6, a cutting device 22 is employed to cut a substantially flat sealing portion in the wall of container 12 or pipe 12A under nut 16 Cutting device 22 includes a bushing 24 in which a cutting or milling bit 26 is rotatably journalled with a shank 28 extending from bushing 24. The exterior of bushing 24 is threaded to be removably secured to nut 16. The top of bushing 24 has a head 30, which can be used to tighten and remove cutting device 22 with respect to nut 16 of collar 14. A stopper collar 32 is positioned about shank 28, and can be locked to shank 28 by means of a set screw (not shown) at a selected height above head 30. In this manner, the depth to which bit 26 cuts the substantially flat sealing portion is controlled so as to be less than the thickness of the wall. It is important that the wall not be penetrated by the cutting device 22 so that the fluid in container 12 or pipe 12A will not be accidently released. The sealing portion is cut in the wall by rotating the shank 28 and advancing the shank until the stopper collar 32 abuts head 30, for example, with an electric drill (not shown). The cutting device 22 is then removed from collar 14 by unthreading bushing 24 from nut 16. Any debris, such as metal shavings, remaining in nut 16, can be removed, for example with a blast of compressed air.

As best shown in FIGS. 7-10, a coupling device 34 is adapted to be secured to nut 16 of the connecting mechanism. Coupling device 34 includes a threaded portion 36 and head 38 by which the coupling device can be tightened within nut 16. Coupling device 34 also includes a lower portion 40 adapted to form a seal with the substantially flat sealing portion of the container 12 or pipe 12A by means of gaskets or 0-rings of Teflon ® brand seating material or other fluid resistant material 42 to be compressed against the sealing portion of container 12 or pipe 12A by tightening head 38. Coupling device 34 includes an upper threaded portion 44 and optionally a portion 46 below portion 44 with flats for gripping coupling device 34. Coupling device 34 also includes an axial bore 48, whose purpose will also be subsequently described.

In the embodiment shown in the drawings, the apparatus includes valve mechanism 50, comprising a ball valve 52 with a pair of internally threaded portions 54 and 56, and a bore 58. Valve mechanism 50 is secured to the upper threaded portion 44 of coupling device 34, assisted by gripping the flats of portion 46, and screwing valve mechanism 50 onto portion 44.

A drilling mechanism for cutting an access port in the wall of container 12 or pipe 12A is provided including a housing 60, and a drilling tool 62 having a shank 64 and a drilling portion 66. The lower end of housing 60 is threaded to be secured by screwing into threaded portion 56 of valve mechanism 50. If desired, the drilling mechanism can be secured directly to coupling device 34, by forming the lower end of housing 60 with internal threads, or by providing internal threads on coupling device 34 and using the external threads on the lower end of housing 60. In such latter case, valve mechanism 50 is omitted. Housing 60 also includes an axial bore 68 through which the drilling tool can be rotated and advanced and retracted and through which fluids can pass. Axial bore 68 is aligned with bore 48 of coupling device 3 and the bore of valve mechanism 50, such that portions of drilling tool 62 can pass to cut the access port in container 12 or pipe 12A. The upper portion of housing 60 includes a sealing plug 70 through which shank 64 passes and can be rotated and reciprocally advanced and retracted without the leaking of fluids. Sealing plug 70 desirably supports one or more 0-rings 72 (one shown) of fluid resistant material such as Teflon Ⓡ brand material in a recess 74 formed on the perimeter of plug 70. Housing 60 may also include a lateral port 76 communicating with axial bore 68 through which fluids can pass.

The apparatus of the present invention optionally includes sampling means for sampling and identifying fluid withdrawn from the container or pipe. As shown in FIG. 1, the sampling means in the preferred embodiment includes a conduit 78 connected at one end to the port 76 of housing 60, and at the other end to a manifold 80 having various ports and attachments, such as a valved line 82 to a cylinder (not shown) of a purging gas, a valved line 84 to analytical apparatus (not shown) which can be a standard device known in the industry for identifying gases, and another valved line 86.

The method of the present invention can be practiced by securing apparatus 10 to the container 12 or to the pipe or pipeline 12A. As noted above, it is preferred to select a portion of a wall of container 12 or pipe 12A of substantially uniform thickness and to clean that portion by methods known to the art such as by brushing with a wire brush. The portion of substantially uniform thickness can be located by measuring the thickness of a number of closely spaced points along the surface, for example, by ultrasonic gauging.

In the method, a connecting mechanism, such as collar 14, providing support for access to the interior of the container or pipe, is tightly secured with nut 16 positioned above the selected portion of the container or pipe, by tightening nut or nuts 20 on bolt or bolts 18. Cutting device 22 is removably secured to the connecting mechanism by threading bushing 24 into nut 16 for cutting a substantially flat sealing portion in the exterior of the container or pipe. A substantially flat sealing portion is cut by rotating and advancing shank 28 as described above.

Following securing of the connecting mechanism 14, the cutting of the substantially flat sealing portion and removal of the cutting device 22, coupling device 34 is secured to the connecting mechanism in fluid-tight relation by screwing threaded portion 36 into nut 16 As noted above, coupling device 34 forms a seal by means of 0-rings 42 with the container or pipe and has a bore 48 to allow fluid to pass therethrough.

The preferred method comprises securing valve mechanism 50 in fluid-tight relation to the coupling device 34 by threading portion 54 of the valve mechanism onto threaded portion 44 of coupling device 34. A drilling mechanism comprising housing 60 and drilling tool 62 is secured to the valve mechanism 50 in fluid-tight relation by threading the lower end of housing 60 into portion 56 of the valve mechanism.

The method optionally further comprises securing sampling means for obtaining a sample of and determining the identity of fluid from the container or pipe to port 76 of housing 60 of the drilling mechanism thus providing access to bore 68. The method also includes drilling an access port in the container 12 or pipe 12A through the seal formed by the lower portion 40 of coupling device 34 with the container or pipe, by rotating and advancing shank 64 of drilling tool 62 into housing 60 of the drilling mechanism to advance bit 66 through bore 68, the bore of the valve mechanism 50 and bore 48 of coupling device 34 and into the container or pipe. The drilling tool 60 is then withdrawn from the interior of the container 12 or pipe 12A and the bores of coupling device 34 and valve mechanism 50. As heretofore described, fluid from the container or pipe is retained in the described bores, and an inert gas, such as helium, can be supplied into the apparatus through manifold 80, if present, to purge the apparatus or to provide positive pressure therein. Fluid can be withdrawn from the container or pipe through the bores of the coupling device 34, the valve mechanism 50, and the housing 60 of the drilling mechanism into the sampling means, if present, and the identity of the fluid withdrawn from the container can be determined by sampling the fluid in the sampling means and analyzing the fluid as described above.

While particular embodiments of the apparatus and method of the present invention have been shown and described, it will be appreciated by those skilled in the art that changes and modifications may be made thereto without departing from the invention in its broader aspects and as set forth in the following claims.

What is claimed is:

1. A containerless apparatus for accessing fluid contents of a pressurized member, comprising:
   a. connecting means for providing support for a port to the interior of the member, said connecting means adapted to be secured to the member;
   b. means for securing said connecting means to the member;
   c. cutting means, adapted to be removably secured to said connecting means, for cutting a substantially flat sealing portion in the exterior of the member;
   d. drilling means including a housing and a drilling tool having a shank and a drilling bit for cutting an access port in the wall of the member, said housing means including a bore through which said drilling tool is adapted to be reciprocally moved and rotated and through which fluids may pass, said housing having a seal in the bore at one end with said shank passing therethrough in fluid-tight relation; and
   e. coupling means adapted to be secured to said connecting means in fluid-tight relation for coupling said drilling means to said connecting means, said coupling means having sealing means for maintaining said coupling means in fluid-tight relation with the substantially flat sealing portion in the exterior of the member and for allowing a portion of said drilling tool and fluids to pass therethrough.

2. The apparatus defined by claim 1, wherein said housing of said drilling means has at least one port providing access to said bore, said apparatus further having sampling means for determining the identity of fluid from the member, said sampling means connected in fluid passage relationship to said at least one port of said drilling means.

3. The apparatus defined by claim 1, further having valve means securable in fluid-tight relation between said coupling means and said drilling means for controlling the passage of fluids therebetween, said valve means having an open, fluid passage position and a closed fluid blocking position, and said valve means having a bore therethrough such that when said valve means is in the open fluid passage position the drilling tool may move reciprocally and rotatably therethrough and fluid from the member may pass therethrough.

4. The apparatus defined by claim 1 for accessing fluid contents of a pressurized member having at least one wall having a portion of substantially uniform thickness, wherein said connecting means is adapted to be secured to the member with the support for the port being positioned above the portion of the wall of substantially uniform thickness.

5. Containerless apparatus for accessing fluid contents of a pressurized member having at least one wall having a portion of substantially uniform thickness, comprising:
   a. connecting means defining a support for providing a port to the interior of the member, said connecting means adapted to be secured to the portion of the wall of the member of substantially uniform thickness;
   b. means for securing said connecting means to the pressurized member with said support defined by said connecting means positioned above the portion of the wall of the member of substantially uniform thickness;
   c. cutting means adapted to be removably secured to said connecting means for cutting a substantially flat sealing portion in the exterior of the wall of the member at the portion of substantially uniform thickness;
   d. drilling means including a housing and a drilling tool having a shank and a drilling bit for cutting an access port in the wall of the member at the portion of substantially uniform thickness, said housing means including a bore through which said drilling tool is adapted to be reciprocally moved and rotated and through which fluids may pass, and said housing having at least one port providing access to said bore, said housing having a seal in the bore at one end with said shank passing therethrough in fluid-tight relation;
   e. coupling means adapted to be secured to said connecting means in fluid-tight relation for coupling said drilling means to said connecting means, said coupling means having sealing means adapted to form a seal with the substantially flat sealing portion in the wall of the member at the portion of substantially uniform thickness for maintaining said coupling means and said drilling means in fluid-tight relation with the member, and for allowing a portion of said drilling tool and fluid from the member to pass therethrough;

valve means securable in fluid-tight relation between said coupling means and said drilling means for controlling the passage of fluids therebetween, said valve means having an open fluid passage position and a closed fluid blocking position, and said valve means having a bore therethrough such that when said valve means is in the open position the drilling tool may move reciprocally and rotatably therethrough and fluid from the member may be drawn for determining of its identity.

6. The apparatus defined by claim 5, further having sampling means for determining the identity of the fluid connected in fluid passage relationship to the said at least one port of said drilling means.

7. A method for accessing fluid contents of a pressurized member, comprising:
   a. securing connecting means to the member for providing support for access to the interior of the member;
   b. removably securing cutting means to said connecting means for cutting a substantially flat sealing portion in the exterior of the member;
   c. cutting a substantially flat sealing portion in the exterior of the member through the connecting means;
   d. removing the cutting means from the connecting means;
   e. securing coupling means to said connecting means in fluid-tight relation to the member, said coupling means being adapted to form a seal with the substantially flat sealing portion in the exterior of the member and having a bore to allow fluid from the member to pass therethrough; drilling means to said
   f. securing drilling means to said coupling means in fluid-tight relation, said drilling means including a housing and a drilling tool having a shank and a drilling bit for cutting an access port in the substantially flat sealing portion in the exterior of the member, said housing including a bore through which said drilling tool is adapted to be reciprocally moved and rotated therethrough and through the bore of said coupling means, and through which fluids may pass, and said housing having a seal at one end with said shank passing therethrough in fluid tight relation;
   g. drilling an access port in the substantially flat sealing portion of the member through the seal formed by the coupling means with the substantially flat sealing portion of the member by rotating and advancing the shank of the drilling tool into the housing of the drilling means to advance the bit of the drilling tool through the bore of the housing of the drilling means and the bore of the coupling means and into the member; and
   h. withdrawing the drilling tool from the interior of the member and the bore of the coupling means.

8. The method defined in claim 7, further comprising securing valve means in fluid-tight relation between said coupling means and said drilling means for controlling the passage of fluids therebetween, said valve means having an open, fluid passage position and a closed fluid blocking position, said and said valve means having a bore therethrough such that when said valve means is in the open position the drilling tool may move reciprocally and rotatably therethrough and fluid from the member may be drawn to the sampling means for determination of its identity.

9. The method defined in claim 7, wherein the housing of the drilling means has a port providing access to the bore therein, and further comprising securing sampling means for determining the identity of fluid from the member to said port of said drilling means, withdrawing fluid from the member through the bores of the coupling means and the drilling means into the sampling means, and determining the identity of the fluid withdrawn from the member by sampling the fluid in the sampling means.

10. The method defined in claim 7 further comprising locating a portion of a wall of the pressurized member having a portion of substantially uniform thickness, securing said connecting means to the member with the support for the port being positioned above the portion of the wall of substantially uniform thickness, and drilling the access port in the member through the portion of the wall of substantially uniform thickness.

11. A method for accessing fluid contents of a pressurized member, comprising:
 a. locating a portion of a wall of the member having a substantially uniform thickness;
 b. securing connecting means for providing support for access to the interior of the member to the portion of the wall of the member of substantially uniform thickness, with the support defined by said connecting means positioned above the portion of the wall of the member of substantially uniform thickness;
 c. removably securing cutting means to said connecting means for cutting a substantially flat sealing portion in the exterior of the portion of the wall of the member of substantially uniform thickness;
 d. cutting a substantially flat sealing portion in the exterior of the portion of the wall of the member of substantially uniform thickness;
 e. removing said cutting means from said connecting means;
 f. securing coupling means to said connecting means in fluid-tight relation to the flat sealing portion cut in the wall of the member, said coupling means being adapted to form a seal with the flat sealing portion of the member and having a bore to allow fluid from the member to pass therethrough;
 g. securing valve means securable in fluid-tight relation to said coupling means for controlling the passage of fluids therethrough, said valve means having an open, fluid passage position, a closed fluid blocking position, and a bore extending therethrough when said valve means is in said open, fluid passage position
 h. securing drilling means including a housing and a drilling tool having a shank and a drilling bit for cutting an access port in the wall of the member at the portion of substantially uniform thickness to said valve means, said housing including a portion having a bore aligned with the bores in said valve means and said coupling means through which said drilling tool is adapted to be reciprocally moved and rotated and through which fluids may pass, said drilling means having a seal at one end with said shank passing therethrough in fluid-tight relation;
 i. drilling an access port in the substantially flat sealing portion of the member through the seal formed by the coupling means with the member by rotating and advancing the shank of the drilling tool into the housing of the drilling means to advance the bit of the drilling tool through the bore of the housing of the drilling means, the bore of the valve means while the valve means is in the open position and the bore of the coupling means and into the substantially flat sealing portion of the member; and
 j. withdrawing the drilling tool from the interior of the member and the bores of the coupling means and the valve means.

12. The method defined in claim 11, further comprising securing sampling means for determining the identity of fluid from the member to a port of said drilling means providing access to the bore of said drilling means, withdrawing fluid from the member through the bores of the coupling means and the drilling means into the sampling means, and determining the identity of the fluid withdrawn from the member by sampling the fluid in the sampling means.

* * * * *

UNITED STATES PATENT AND TRADEMARK OFFICE
CERTIFICATE OF CORRECTION

PATENT NO. : 5,163,483
DATED : November 17, 1992
INVENTOR(S) : Charles K. Eckman It is certified that error appears in the above-indentified patent and that said Letters Patent is hereby corrected as shown below:

Column 6, line 26, and Column 7, line 67, "nut 16", each occurrence, should read --nut 16.--;

Column 7, line 19, "3" should read --34--;

Claim 3, Column 9, line 18, "open" should read --open,--;

Claim 5, Column 10, line 1, "valve means" should read --f. valve means--;

Claim 7, Column 10, lines 33 and 34, delete "drilling means to said";

Claim 8, Column 10, line 63, delete the first occurrence of "said";

Claim 11, Column 12, line 9, "position" should read --position;--.

Signed and Sealed this

Twelfth Day of October, 1993

Attest:

BRUCE LEHMAN

*Attesting Officer*  *Commissioner of Patents and Trademarks*